No. 862,485. PATENTED AUG. 6, 1907.
J. R. KIDNEY.
TROLLEY WHEEL.
APPLICATION FILED FEB. 25, 1907.
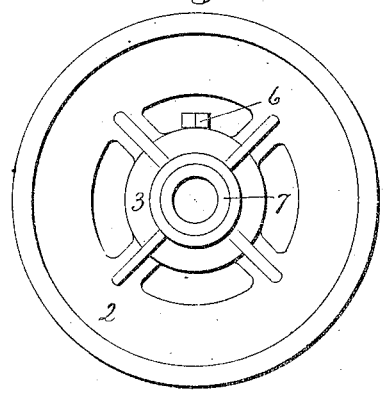
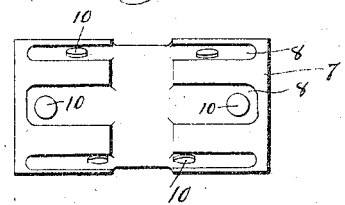
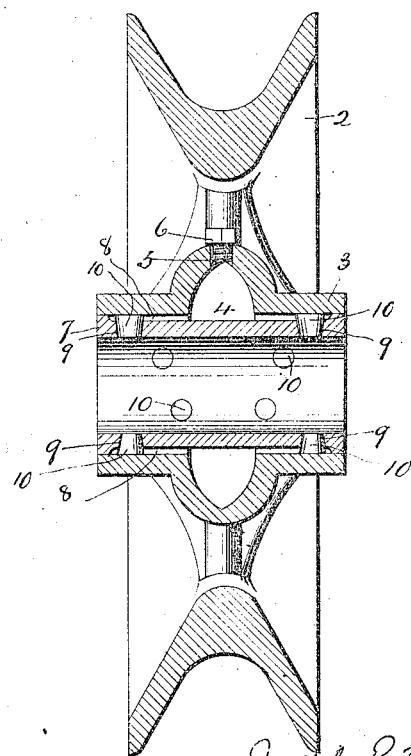
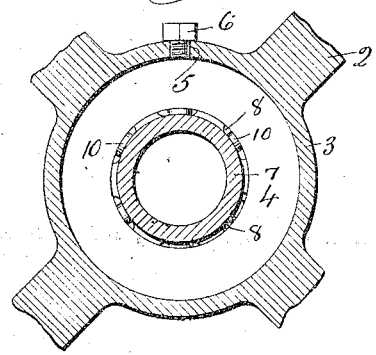
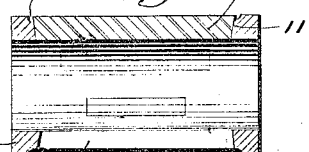

UNITED STATES PATENT OFFICE.

JOSIAH R. KIDNEY, OF EAST HAMPTON, CONNECTICUT, ASSIGNOR TO THE EAST HAMPTON BELL CO., OF EAST HAMPTON, CONNECTICUT, A CORPORATION.

TROLLEY-WHEEL.

No. 862,485.

Specification of Letters Patent.

Patented Aug. 6, 1907.

Application filed February 25, 1907. Serial No. 359,265.

*To all whom it may concern:*

Be it known that I, JOSIAH R. KIDNEY, a citizen of the United States, residing at East Hampton, in the county of Middlesex and State of Connecticut, have invented a new and useful Improvement in Trolley-Wheels; and I do hereby declare the following, when taken in connection with the accompanying drawings, and the letters of reference marked thereon, to be a full, clear, and exact description of the same, and which said drawings constitute part of this specification, and represent, in—

Figure 1 a side view of a trolley wheel constructed in accordance with my invention. Fig. 2 a vertical section through the same. Fig. 3 a plan view of the outside of the bushings detached. Fig. 4 a longitudinal sectional view through the hub chamber. Fig. 5 a sectional view illustrating a modification of the form of the bushing.

This invention relates to an improvement in trolley wheels and particularly to bushings therefor, the object being to provide a bushing which will permit lubricating material contained in the hub to pass through it so as to maintain the proper amount on the pin; and the invention consists in the construction hereinafter described and particularly recited in the claims.

The wheel 2 is formed with a hub 3 in the center of which is an annular deep groove or chamber 4 formed with an opening 5 adapted to be closed by a screw plug
6. The passage through the hub is considerably larger in diameter than the diameter of the pin on which the wheel is mounted, and into this hub is placed a bushing 7. This bushing fits very snugly in the hub. In the outer surface of the bushing a series of longitudinal grooves 8 are formed, and in these grooves are a number of holes 9 tapering inward, and in each hole is inserted a plug 10 of wood, the plugs being driven in so that their inner ends are flush with the bushing. As before stated, the bushing closely fits the hub, and the ends of the bushing form a substantially oil tight joint. The chamber 4 is filled with oil through the hole 5 which is then closed by the plug 6 and this oil will percolate through the plugs and spread upon the inner surface of the bushing and upon the usual pin passing through it, a sufficient amount of oil passing through the plugs to maintain proper lubrication but only such an amount as will be necessary, the flow of oil through the plugs being so slow that even if the surfaces of the pin or adjacent surface of the bushing become worn, an excess amount of oil will not escape from the chamber. If for certain purposes a larger amount of lubricating material is required, the bushing may be formed with tapered slots 11 in the grooves 8 instead of the holes above described, and tapered strips of wood 12 inserted into these slots, the operation being substantially the same. The chamber will contain sufficient amount of oil to keep the bearing lubricated for a long time and the supply may be replenished from time to time as necessary; but at no time will an excess amount of oil pass onto the bearing, hence the bearing will not become coated and the electric contact will not be interfered with.

By tapering the holes in the bushing and correspondingly tapering the wooden plugs or strips therefor the plugs or strips are securely held in place. These wheels are made up in large quantities and may not be put into immediate use so that the plugs may dry up and shrink, and if made straight would be liable to fall out of place, but by tapering them they are securely held in the bushing and ready to perform their function when required.

I claim:—

A trolley wheel comprising a hub formed with an annular chamber, a bushing closely fitting said hub, said bushing formed with exterior grooves, holes in said grooves and extending through said bushing, and wood plugs inserted into said holes, substantially as described.

In testimony whereof, I have signed this specification in the presence of two subscribing witnesses.

JOSIAH R. KIDNEY.

Witnesses:
 VINE B. STARR,
 JAMES E. NICHOLS.